US010514068B2

(12) United States Patent
McCloy et al.

(10) Patent No.: US 10,514,068 B2
(45) Date of Patent: Dec. 24, 2019

(54) EPHASER CUSHION STOP

(71) Applicant: BorgWarner Inc., Auburn Hills, MI (US)

(72) Inventors: Chad McCloy, Cortland, NY (US); Daniel Brown, Freeville, NY (US); Shawn Blackmur, Brooktondale, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 16/050,571

(22) Filed: Jul. 31, 2018

(65) Prior Publication Data
US 2019/0032722 A1 Jan. 31, 2019

Related U.S. Application Data

(60) Provisional application No. 62/539,147, filed on Jul. 31, 2017.

(51) Int. Cl.
F01L 1/34 (2006.01)
F16D 3/10 (2006.01)
F01L 1/344 (2006.01)
F02D 13/02 (2006.01)

(52) U.S. Cl.
CPC ............ F16D 3/10 (2013.01); F01L 1/34403 (2013.01); F01L 2001/34486 (2013.01); F02D 13/0238 (2013.01)

(58) Field of Classification Search
CPC .... F02D 13/0238; F16D 3/10; F01L 1/34403; F01L 2001/34486

USPC ............................................ 123/90.15, 90.17
See application file for complete search history.

(56) References Cited

U.S. PATENT DOCUMENTS 5,680,837 A    10/1997  Pierik
7,316,212 B2    1/2008  Tagami et al.
7,603,975 B2   10/2009  Sugiura et al.
7,959,537 B2    6/2011  Sugiura et al.
8,555,836 B2   10/2013  David et al.
8,584,636 B2   11/2013  David et al.
8,651,076 B2    2/2014  Walliser et al.
(Continued)

FOREIGN PATENT DOCUMENTS

DE           3721362 A1    2/1988
DE         102008056666    5/2010
(Continued)

Primary Examiner — Ching Chang
(74) Attorney, Agent, or Firm — Reising Ethington P.C.

(57) ABSTRACT

A variable camshaft timing device adjusts phase between a camshaft and a crankshaft and includes a first ring gear configured to connect to the camshaft and rotate about a center axis, having a plurality of radially-inwardly facing gear teeth; a second ring gear axially spaced from the first ring gear, configured to receive rotational input from the crankshaft and rotate about the center axis, having a plurality of radially-inwardly facing gear teeth; a planetary gear assembly including one or more planet gears that are configured for rotation by an electric motor and engage the first ring gear and the second ring gear through the planet gear(s); and a cushioned stop configured to transmit energy between the planetary gear assembly and a planetary gear stop attached to a sprocket or a camshaft plate.

30 Claims, 11 Drawing Sheets

(56) References Cited

U.S. PATENT DOCUMENTS

| | | | |
|---|---|---|---|
| 8,813,701 B2 * | 8/2014 | Lengfeld | F01L 1/352 123/90.11 |
| 8,950,371 B2 | 2/2015 | Schaefer et al. | |
| 2010/0064997 A1 | 3/2010 | Ai | |
| 2017/0152767 A1 | 6/2017 | Boese | |
| 2018/0003277 A1 | 1/2018 | Brown | |

FOREIGN PATENT DOCUMENTS

| | | |
|---|---|---|
| EP | 2006501 A1 | 12/2008 |
| EP | 2676011 B1 | 10/2014 |
| JP | S6187910 A | 5/1986 |
| JP | 10311208 | 11/1998 |
| JP | 2002349705 A | 5/2001 |
| JP | 2009036104 | 2/2009 |
| WO | WO200842621 | 4/2008 |

* cited by examiner

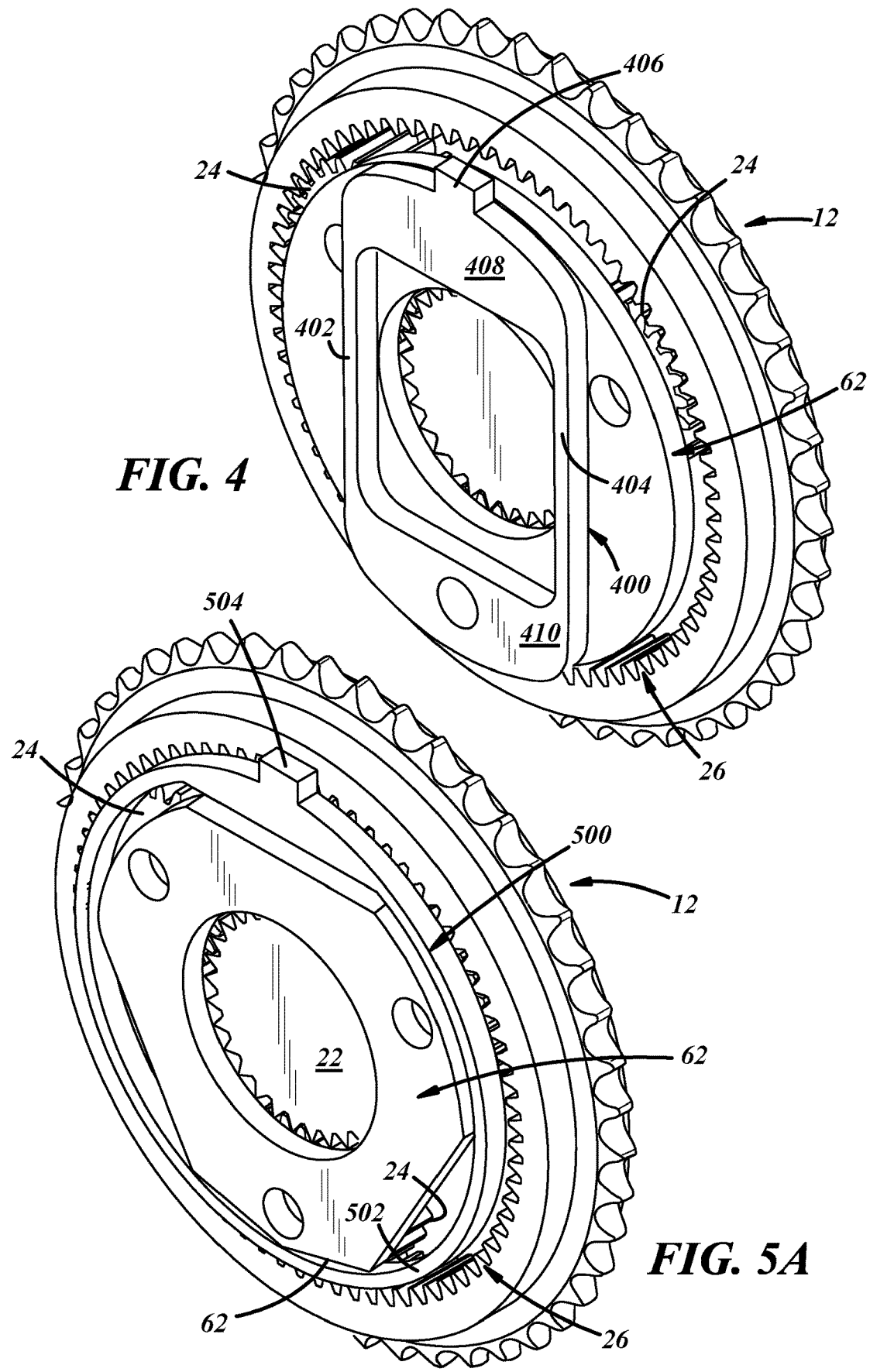

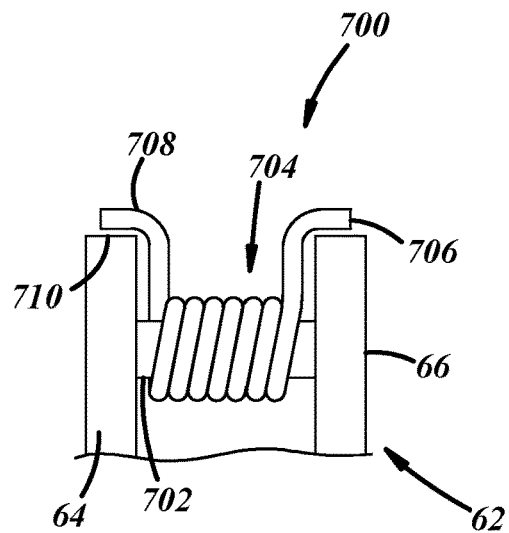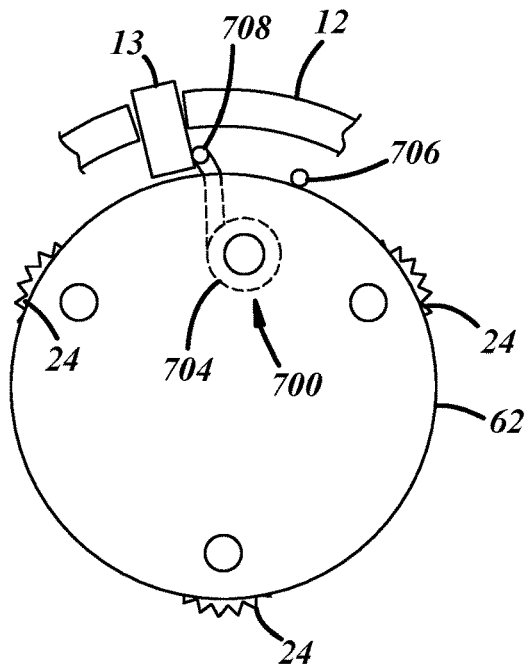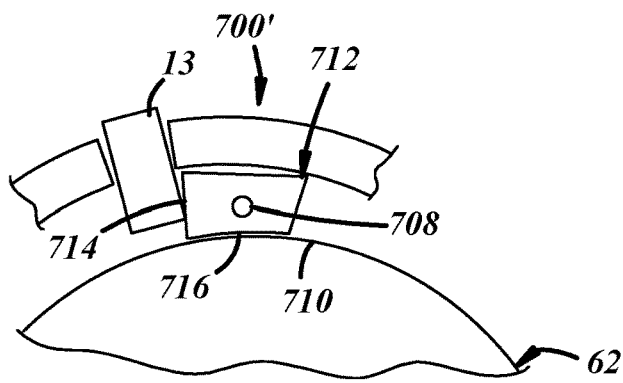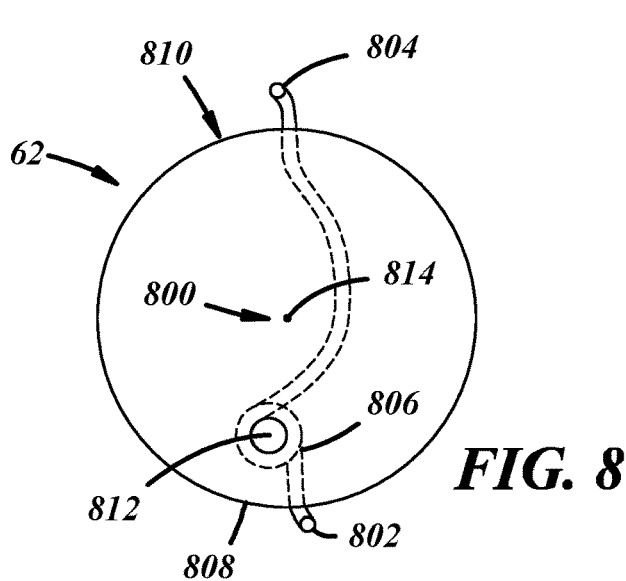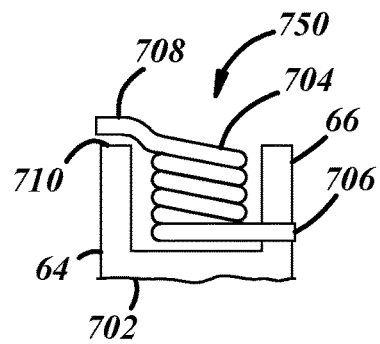
FIG. 7A
FIG. 7B
FIG. 7D
FIG. 7C
FIG. 8

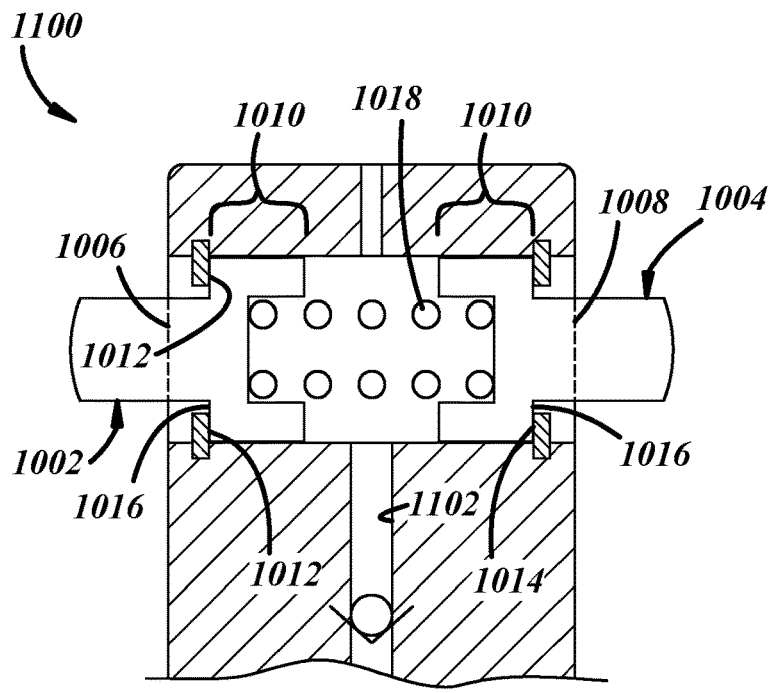
FIG. 10B
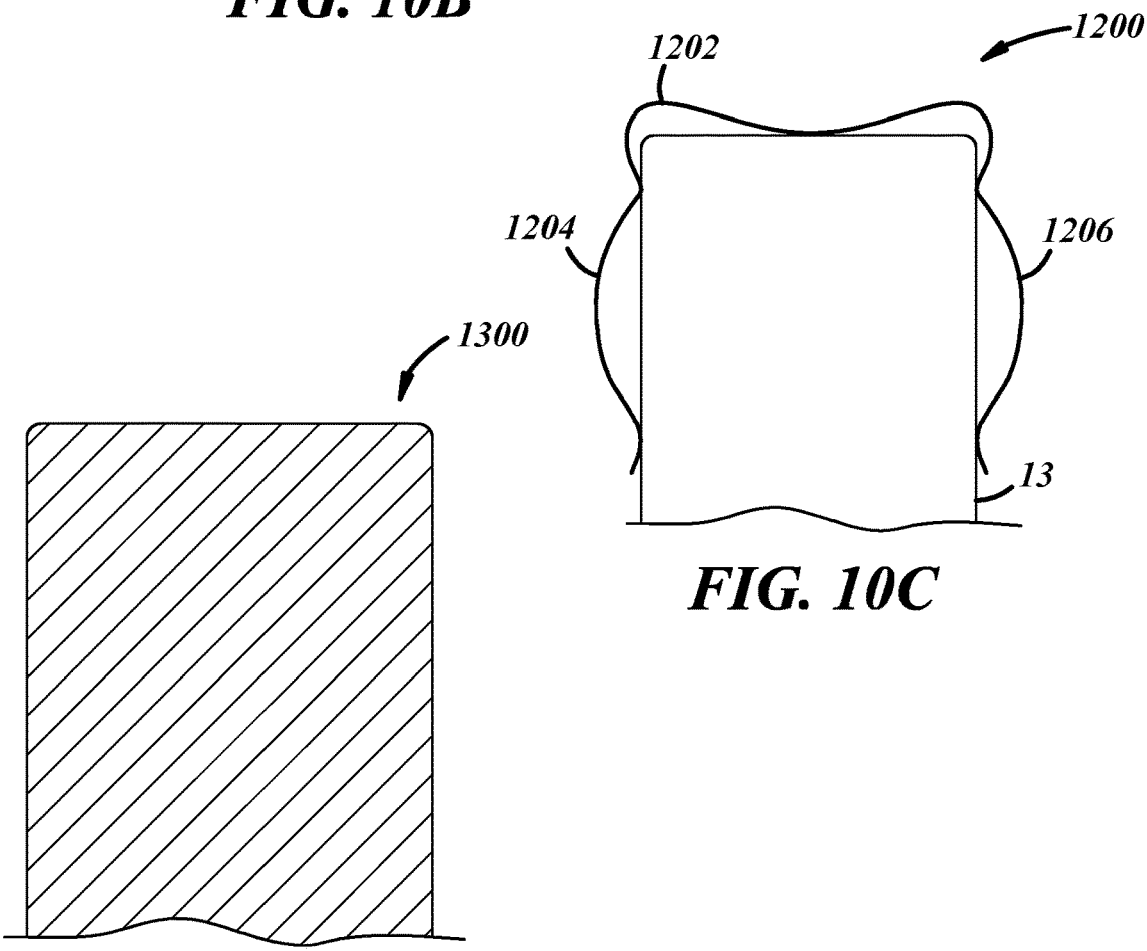
FIG. 10C
FIG. 10D

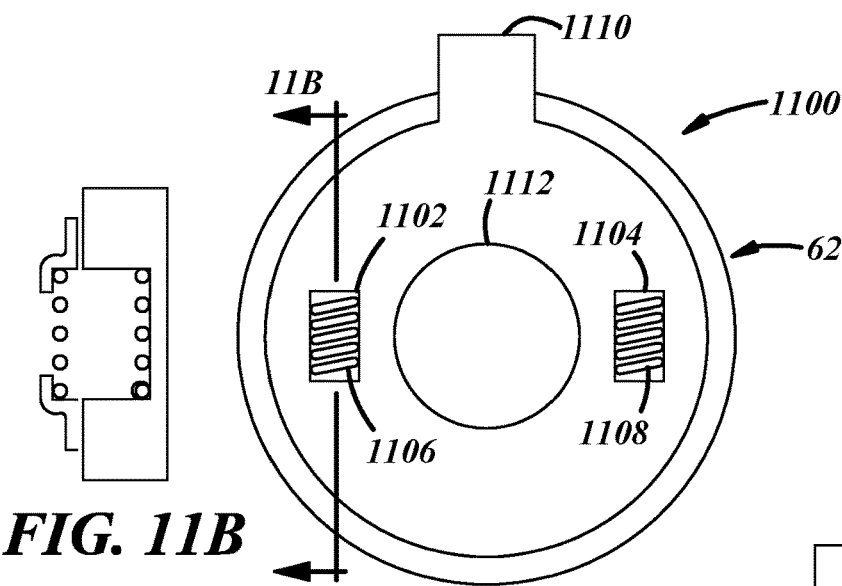
FIG. 11B
FIG. 11A
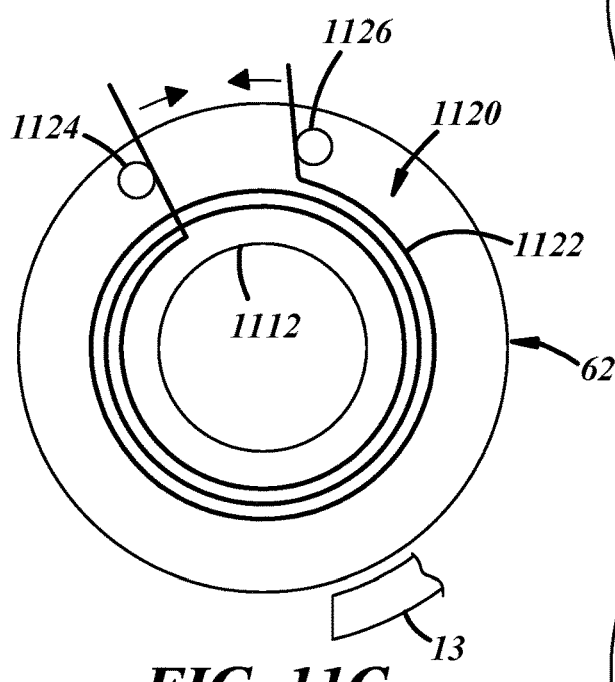
FIG. 11C
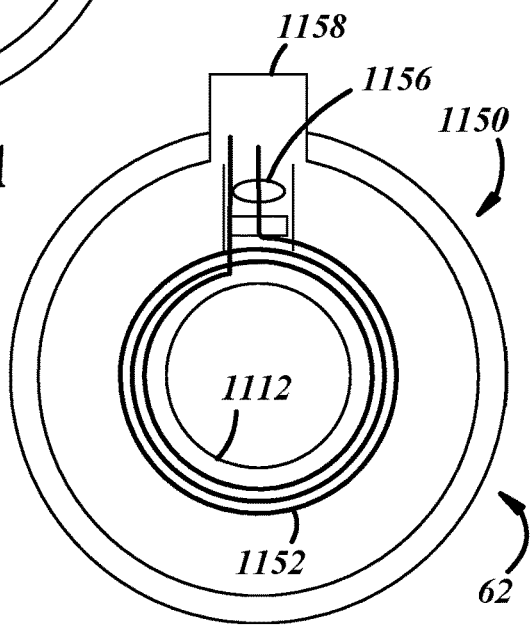
FIG. 11D
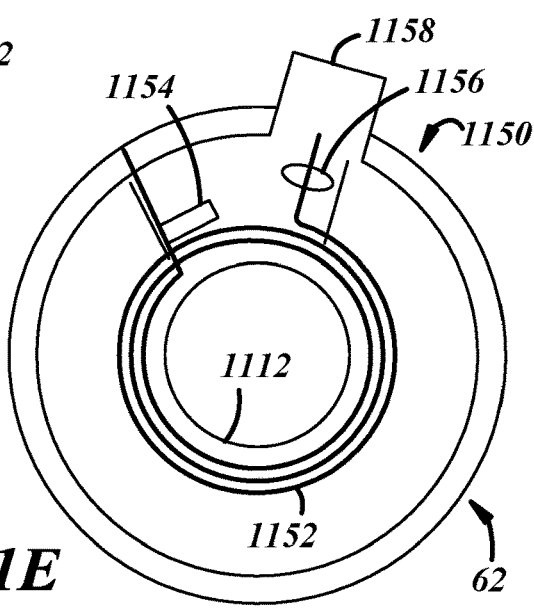
FIG. 11E

EPHASER CUSHION STOP

CROSS-REFERENCE TO RELATED APPLICATIONS

This application claims the benefit of U.S. Patent Application No. 62/539,147 filed on Jul. 31, 2018, the disclosure of which is herein incorporated by reference in its entirety.

TECHNICAL FIELD

The present application relates to electrically-controlled camshaft phasers (ePhasers) and, more particularly, to stops used in electrically-controlled camshaft phasers.

BACKGROUND

Internal combustion engines (ICEs) commonly use variable camshaft timing to control the relative angular position of a camshaft relative to the crankshaft. Variable camshaft timing is accomplished using camshaft phasers that vary the angular position of the camshaft relative to the angular position of the crankshaft to advance, retard, or maintain the relative angular position between the camshaft and the crankshaft. The relative angular position may also be referred to as the "phase" between the camshaft and the crankshaft. The magnitude of the relative angular position difference between the camshaft and the crankshaft is mechanically limited within a particular angular range (also called the range of authority). And camshaft phasers often enforce these limits using mechanical stops located on a sprocket and on a camshaft.

The mechanical stops have been used on hydraulically-controlled camshaft phasers as well as electrically-controlled camshaft phasers with increasing frequency. However, some mechanical stops used in electrically-controlled camshaft phasers can cause binding. In particular, mechanical stops mounted on the sprocket and on the camshaft may cause the electrically-controlled camshaft phasers to bind occasionally. It would be helpful to configure mechanical stops in a way that reduces the electrically-controlled camshaft phaser chances of binding.

SUMMARY

In one embodiment, a variable camshaft timing device adjusts phase between a camshaft and a crankshaft and includes a first ring gear configured to connect to the camshaft and rotate about a center axis, having a plurality of radially-inwardly facing gear teeth; a second ring gear axially spaced from the first ring gear, configured to receive rotational input from the crankshaft and rotate about the center axis, having a plurality of radially-inwardly facing gear teeth; a planetary gear assembly including one or more planet gears that are configured for rotation by an electric motor and engage the first ring gear and the second ring gear through the planet gear(s); and a cushioned stop configured to transmit energy between the planetary gear assembly and a planetary gear stop attached to a sprocket or a camshaft plate.

In another embodiment, a variable camshaft timing device that adjusts phase between a camshaft and a crankshaft includes a first ring gear, configured to connect to the camshaft and rotate about a center axis, having a plurality of radially-inwardly facing gear teeth; a second ring gear axially spaced from the first ring gear, configured to receive rotational input from the crankshaft and rotate about the center axis, having a plurality of radially-inwardly facing gear teeth; a planetary gear assembly including one or more planet gears engaged with the first ring gear and the second ring gear and positioned radially inwardly from the first ring gear and the second ring gear; an electric motor having an output shaft that rotates the planetary gear assembly and controls phase adjustment between the camshaft and crankshaft by angularly displacing the first ring gear with respect to the second ring gear; and a cushioned stop that is carried by the planetary gear assembly and isolated from the output shaft of the electric motor, wherein the cushioned stop absorbs rotational energy when engaged with a planetary gear stop of the variable camshaft timing device.

In yet another embodiment, a variable camshaft timing device that adjusts phase between a camshaft and a crankshaft includes a first ring gear, configured to connect to the camshaft and rotate about a center axis, having a plurality of radially-inwardly facing gear teeth; a second ring gear axially spaced from the first ring gear, configured to receive rotational input from the crankshaft and rotate about the center axis, having a plurality of radially-inwardly facing gear teeth; a planetary gear assembly configured for rotation by an electric motor and including one or more planet gears engaging the first ring gear and the second ring gear; and a cushioned stop that is mechanically linked to a sprocket or a camshaft plate and absorbs rotational energy from the planetary gear assembly through a planet gear.

BRIEF DESCRIPTION OF THE DRAWINGS

FIG. 4 is a perspective view of an implementation of a cushioned stop along with a portion of an electrically-operated camshaft phaser;

FIG. 5A is a perspective view of another implementation of a cushioned stop along with a portion of an electrically-operated camshaft phaser;

FIGS. 7A-7B are profile views of another implementation of a cushioned stop along with a portion of an electrically-operated camshaft phaser;

FIG. 7C is a profile view of another implementation of a cushioned stop along with a portion of an electrically-operated camshaft phaser;

FIG. 7D is a profile view of another implementation of a cushioned stop along with a portion of an electrically-operated camshaft phaser;

FIG. 8 is a profile view of another implementation of a cushioned stop along with a portion of an electrically-operated camshaft phaser;

FIG. 10B is a cross-sectional view of another implementation of a cushioned stop along with a portion of an electrically-operated camshaft phaser;

FIG. 10C is a cross-sectional view of another implementation of a cushioned stop along with a portion of an electrically-operated camshaft phaser;

FIG. 10D is a cross-sectional view of another implementation of a cushioned stop along with a portion of an electrically-operated camshaft phaser;

FIG. 11A is a profile view of another implementation of a cushioned stop along with a portion of an electrically-operated camshaft phaser;

FIG. 11B is a sectional view of a portion of the cushioned stop shown in FIG. 11A;

FIG. 11C is a profile view of another implementation of a cushioned stop along with a portion of an electrically-operated camshaft phaser;

FIGS. 11D-11E are profile views of another implementation of a cushioned stop along with a portion of an electrically-operated camshaft phaser;

DETAILED DESCRIPTION

Figure 1:
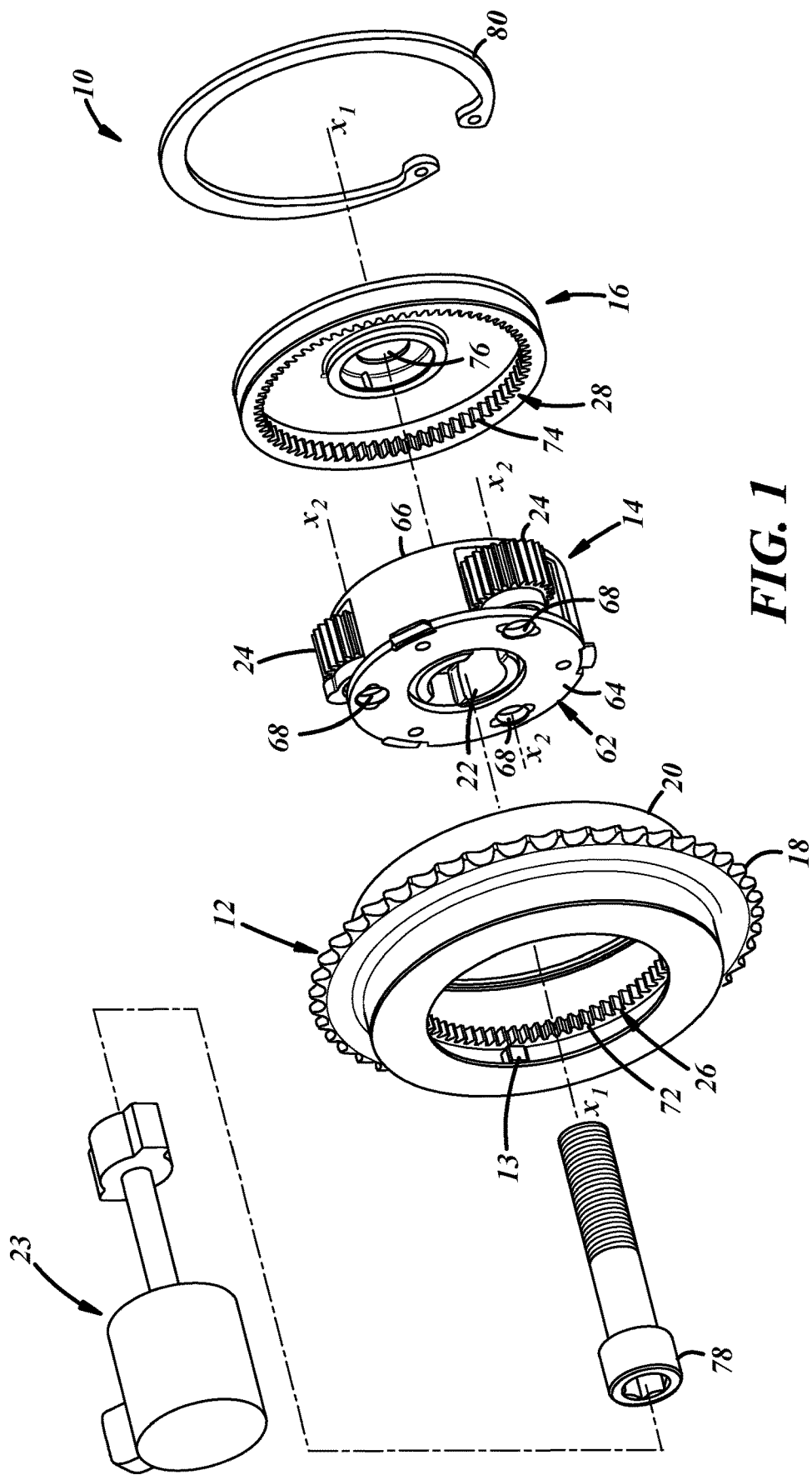
FIG. 1 is an exploded view depicting an implementation of an electrically-operated camshaft phaser.

An electrically-operated camshaft phaser includes one or more cushioned mechanical stops positioned in between the sprocket and the camshaft. The electrically-operated camshaft phaser generally refers to camshaft phasers that are adjusted using electric motors. These electrically-operated camshaft phasers can benefit from cushioned mechanical stops that absorb energy as the camshaft phaser approaches and ultimately reaches the maximum amount of angular adjustment within its range of authority. In the past, the electrically-operated camshaft phaser could adjust the phase of the camshaft relative to the crankshaft until a maximum amount of relative angular difference, or phase, existed at which point a fixed mechanical stop prevented further angular displacement between the camshaft and the crankshaft. For example, an electrically-operated camshaft phaser can include a crankshaft sprocket with an inwardly-facing ring gear, a camshaft plate with a separate inwardly-facing ring gear, and a planetary gear assembly having a plurality of planet gears each in contact with the ring gears. The ring gears have different numbers of gear teeth such that the rotation of the planet gears of the planetary gear assembly with respect to the ring gears causes the relative rotation of the crankshaft sprocket relative to the camshaft plate.

During operation, an electric motor of the electrically-operated camshaft phaser rotates the planetary gear assembly to either maintain or change the relative angular position between the camshaft and the crankshaft. If an output shaft of the electric motor rotates the planetary gear assembly at the same speed as the camshaft, the existing phase between the camshaft and the crankshaft can be maintained and no relative motion between the planetary gear assembly and the ring gears occurs. However, an increase in rotational speed of the electric motor output shaft relative to the rotational speed of the camshaft creates relative angular motion between the planetary gear assembly and the ring gears. The different number of gear teeth of one ring gear relative to the other ring gear results in angular displacement of the cam plate with respect to the crankshaft sprocket in one rotational direction or the other rotational direction either advancing or retarding the phase between the camshaft and crankshaft. If the output shaft of the electric motor rotates at a faster or slower rate than the camshaft for longer than a predetermined amount of time, the planetary gear assembly will collide with a mechanical stop located on the crankshaft sprocket or the camshaft plate preventing further angular displacement between the crankshaft and the camshaft. While the fixed mechanical stop can limit the range of the electrically-operated camshaft phaser, invoking such a limit is accompanied by a direct collision of phaser components that can stress electrically-operated camshaft phasers.

Rather than allow components of an electrically-operated camshaft phaser to directly collide with each other via the mechanical stop, it is possible to incorporate one or more cushioned stops with the planetary gear assembly. Locating the cushioned stop(s) on the planetary gear assembly instead of the camshaft or crankshaft sprocket can increase the overall stiffness between the sprocket and the camshaft plate compared to a similar cushioned stop that acts directly between the sprocket and the camshaft plate of the electrically-actuated camshaft phaser. Further, cushioned stop(s) located on the planetary gear assembly benefit from the mechanical advantage of the gear ratio between planetary gears of the planetary gear assembly and the ring gears. This mechanical advantage can reduce the amount of force used by a cushioned stop to stop angular rotation of a portion of the camshaft phaser because stoppage occurs over a longer arc of travel thereby spreading the amount of distance over which a same amount of work occurs slowing down the camshaft phaser.

Figure 2:
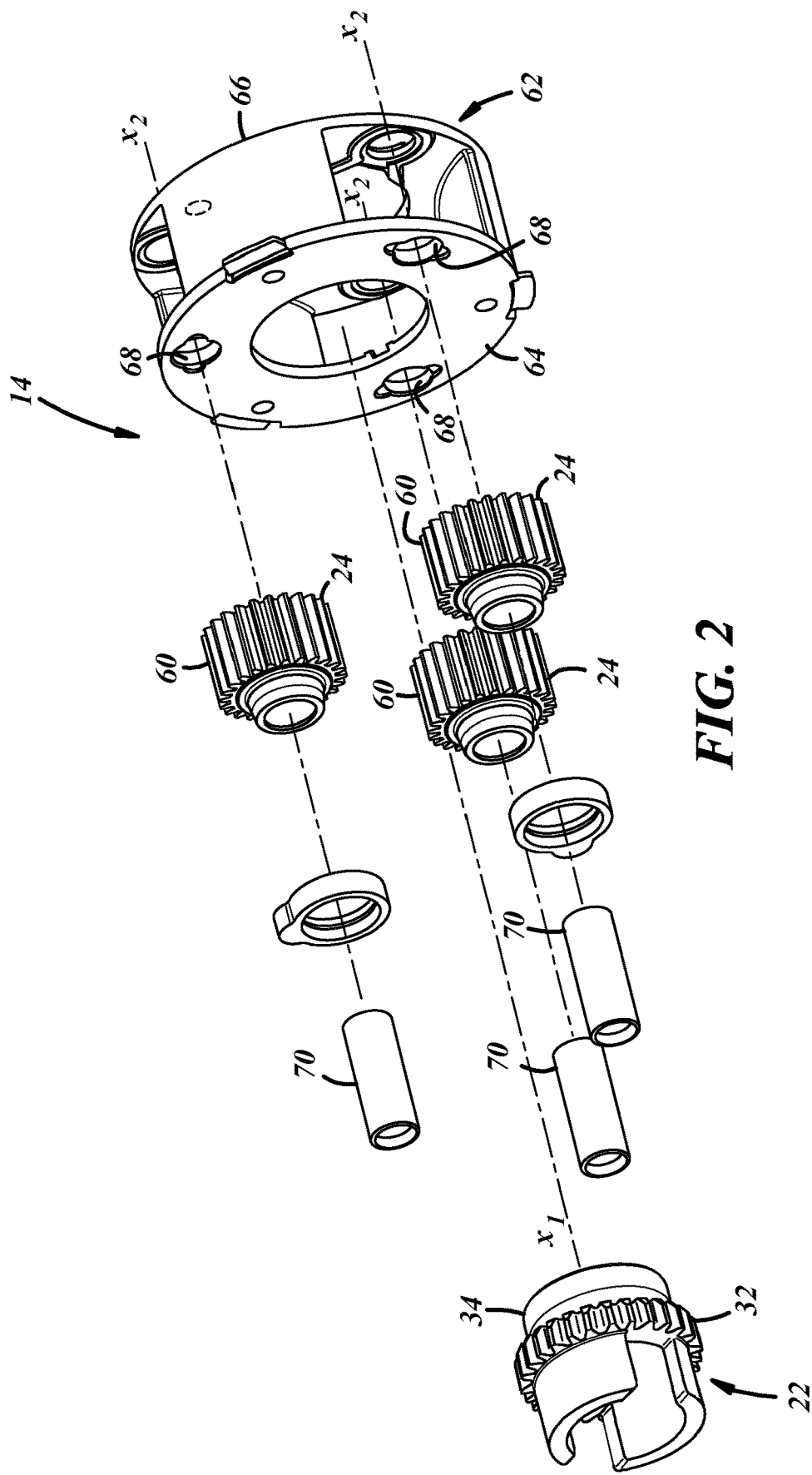
FIG. 2 is an exploded view depicting a portion of an implementation of an electrically-operated camshaft phaser.
Figure 3:
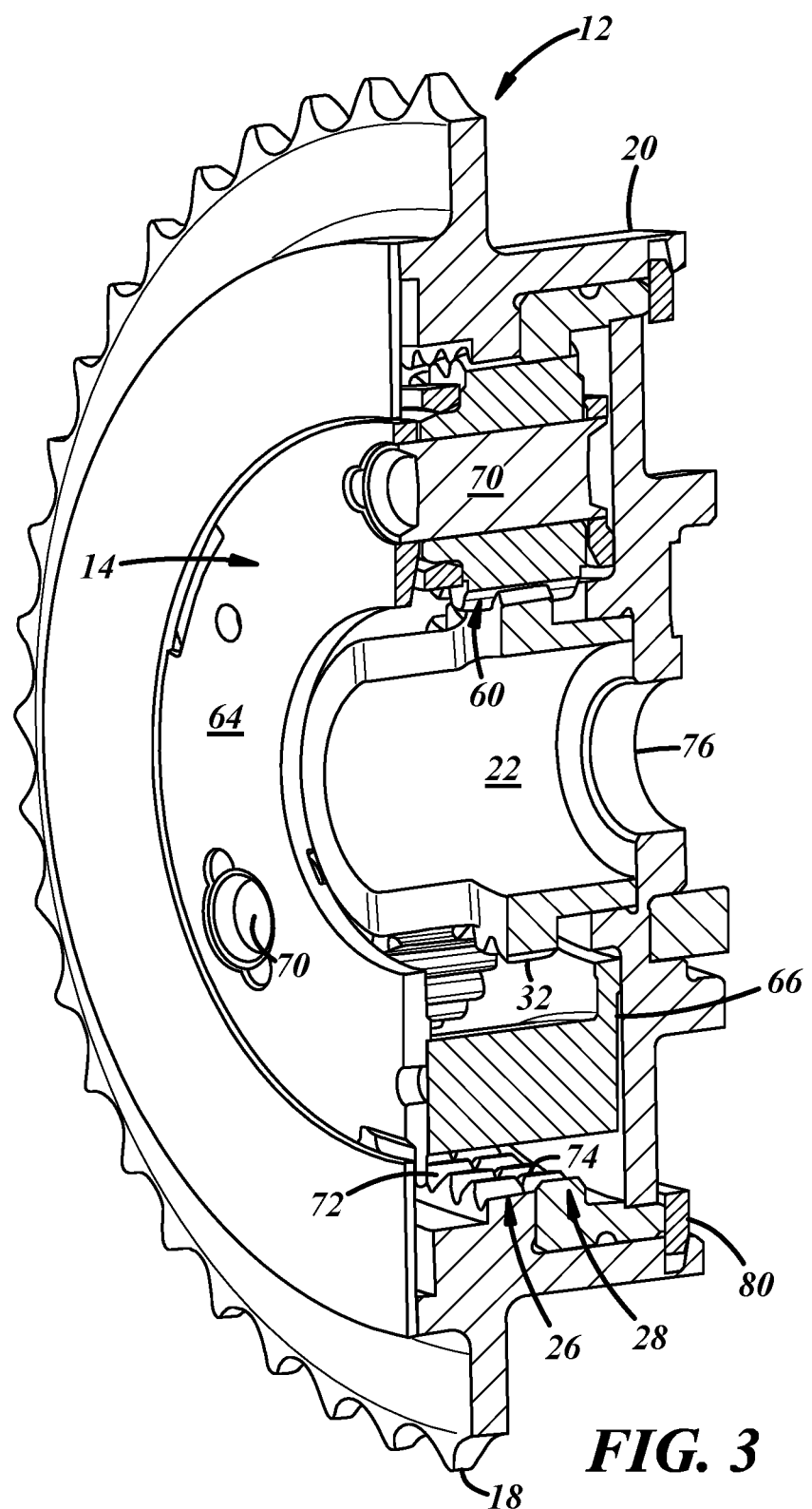
FIG. 3 is a cross-sectional view depicting an implementation of an electrically-operated camshaft phaser.

An embodiment of a camshaft phaser 10 that can incorporate one or more cushioned stops is shown with respect to FIGS. 1-3. The phaser 10 is a multi-piece mechanism with components that work together to transfer rotation from the engine's crankshaft and to the engine's camshaft, and that can work together to angularly displace the camshaft relative to the crankshaft for advancing and retarding engine valve opening and closing. The phaser 10 can have different designs and constructions depending upon, among other possible factors, the application in which the phaser is employed and the crankshaft and camshaft that it works with. In the embodiment presented in FIGS. 1-3, for example, the phaser 10 includes a sprocket 12, a planetary gear assembly 14, and a camshaft plate or plate 16.

The sprocket 12 receives rotational drive input from the engine's crankshaft and rotates about an axis $X_1$. A timing chain or a timing belt can be looped around the sprocket 12 and around the crankshaft so that rotation of the crankshaft translates into rotation of the sprocket via the chain or belt. Other techniques for transferring rotation between the sprocket 12 and crankshaft are possible. Along an outer surface, the sprocket 12 has a set of teeth 18 for mating with the timing chain, with the timing belt, or with another component. In different examples, the set of teeth 18 can include thirty-eight individual teeth, forty-two individual teeth, or some other quantity of teeth spanning continuously around the circumference of the sprocket 12. As illustrated, the sprocket 12 has a housing 20 spanning axially from the set of teeth 18. The housing 20 is a cylindrical wall that surrounds part of the planetary gear assembly 14.

A planetary gear stop 13 can be included on an inwardly-facing surface of the sprocket 12 to limit the angular displacement between the camshaft and the crankshaft. The planetary gear stop 13 is one implementation of a range-limiting element. The planetary gear stop 13 engages a cushioned stop and prevents further angular displacement between the camshaft and the crankshaft in both an advancing direction and a retarding direction. However, the planetary gear stop 13 can be implemented in a number of different ways. For example, rather than existing as a fixed protuberance extending radially-inwardly from the sprocket 12, the planetary gear stop(s) can move. For example, in one implementation the planetary gear stop can be an element that fits into a pocket of the camshaft ring gear such that the planetary gear stop moves to engage an element included on the planetary gear assembly. In one implementation, the planetary gear stop can pivot about an axis or can slide radially-inwardly or radially-outwardly to engage or disengage the planetary gear assembly 14. A variety of different planetary gear stops are described in U.S. patent application Ser. No. 15/635,281 the entirety of which is incorporated by reference.

In the embodiment presented here, the planetary gear assembly 14 includes planet gears 24. A sun gear 22 is driven by an electric motor 23 for rotation about the axis $X_1$. The sun gear 22 engages with the planet gears 24 and has a set of teeth 32 at its exterior that makes direct teeth-to-teeth meshing with the planet gears 24. In different examples, the set of teeth 32 can include twenty-six individual teeth, thirty-seven individual teeth, or some other quantity of teeth spanning continuously around the circumference of the sun gear 22. A skirt 34 in the shape of a cylinder spans from the set of teeth 32. As described, the sun gear 22 is an external spur gear, but could be another type of gear.

The planet gears 24 rotate about their individual rotational axes $X_2$ when in the midst of bringing the engine's camshaft among advanced and retarded angular positions. When not advancing or retarding, the planet gears 24 revolve together around the axis $X_1$ with the sun gear 22 and with the ring gears 26, 28. In the embodiment presented here, there are a total of three discrete planet gears 24 that are similarly designed and constructed with respect to one another, but there could be other quantities of planet gears such as one, two, four or six. The planet gear(s) can be carried by an eccentric shaft in some implementations. However many there are, each of the planet gears 24 can engage with first and second ring gears 26, 28, included with the sprocket 12 and the plate 16, respectively. Each planet gear 24 can have a set of teeth 60 along its exterior for making direct teeth-to-teeth meshing with the ring gears 26, 28. In different examples, the teeth 60 can include twenty-one individual teeth, or some other quantity of teeth spanning continuously around the circumference of each of the planet gears 24. To hold the planet gears 24 in place and support them, a carrier assembly 62 can be provided. The carrier assembly 62 can have different designs and constructions. In the embodiment presented in the figures, the carrier assembly 62 includes a first carrier plate 64 on one side, a second carrier plate 66 on the other side, and cylinders 68 that serve as a hub for the rotating planet gears 24. Planet pins or bolts 70 can be used with the carrier assembly 62.

The first ring gear 26 receives rotational drive input from the sprocket 12 so that the first ring gear 26 and sprocket 12 rotate together about the axis $X_1$ in operation. The first ring gear 26 can be a unitary extension of the sprocket 12—that is, the first ring gear 26 and the sprocket 12 can together form a monolithic structure. The first ring gear 26 has an annular shape, engages with the planet gears 24, and has a set of teeth 72 at its interior for making direct teeth-to-teeth meshing with the planet gears 24. In different examples, the teeth 72 can include eighty individual teeth, or some other quantity of teeth spanning continuously around the circumference of the first ring gear 26. In the embodiment presented here, the first ring gear 26 is an internal spur gear, but could be another type of gear.

The second ring gear 28 transmits rotational drive output to the engine's camshaft about the axis $X_1$. In this embodiment, the second ring gear 28 drives rotation of the camshaft via the plate 16. The second ring gear 28 and plate 16 can be connected together in different ways, including by a cutout-and-tab interconnection, press-fitting, welding, adhering, bolting, riveting, or by another technique. In embodiments not illustrated here, the second ring gear 28 and the plate 16 could be unitary extensions of each other to make a monolithic structure. Like the first ring gear 26, the second ring gear 28 has an annular shape, engages with the planet gears 24, and has a set of teeth 74 at its interior for making direct teeth-to-teeth meshing with the planet gears. In different examples, the teeth 74 can include seventy-seven individual teeth, or some other quantity of teeth spanning continuously around the circumference of the second ring gear 28. With respect to each other, the number of teeth between the first and second ring gears 26, 28 can differ by a multiple of the number of planet gears 24 provided. So, for instance, the teeth 72 can include eighty individual teeth, while the teeth 74 can include seventy-seven individual teeth—a difference of three individual teeth for the three planet gears 24 in this example. In another example with six planet gears, the teeth 72 could include seventy individual teeth, while the teeth 74 could include eighty-two individual teeth. Satisfying this relationship furnishes the advancing and retarding capabilities by imparting relative rotational movement and relative rotational speed between the first and second ring gears 26, 28 in operation. In the embodiment presented here, the second ring gear 28 is an internal spur gear, but could be another type of gear. The plate 16 includes a central aperture 76 through which a center bolt 78 passes to fixedly attach the plate 16 to the camshaft. In addition, the plate 16 is also secured to the sprocket 12 with a snap ring 80 that axially constrains the planetary gear assembly 14 between the sprocket 12 and the plate 16.

Together, the two ring gears 26, 28 constitute a split ring gear construction for the camshaft phaser 10. However, it should be appreciated that other camshaft phaser designs can be used with the cushioned stops. For example, the camshaft phaser could be implemented using an eccentric shaft, a compound planet gear, and two ring gears. Or the camshaft phaser could include more than two ring gears. For instance, the camshaft phaser 10 could include an additional third ring gear for a total of three ring gears. Here, the third ring gear could also transmit rotational drive output to the engine's camshaft like the second ring gear 28, and could have the same number of individual teeth as the second ring gear.

Turning to FIG. 4, a portion of an embodiment of the camshaft phaser 10 is shown along with an embodiment of a cushioned stop 400 carried by the planetary gear assembly 14. The cushioned stop 400 in this embodiment is attached to a carrier assembly 62 used by the planetary gear assembly 14 and includes a plurality of flexural beams 402, 404 as well as an engagement portion 406. The cushioned stop 400 and its flexural beams 402, 404 can be make from a flexible material that allows some deformity in response to rotational force. For example, the cushioned stop 400 can be made from an elastomeric material. But the flexible material can alternatively be metal (e.g., steel) such that the cushioned stop 400 is stamped, formed, or assembled from that metal. In this implementation, the cushioned stop 400 includes a first flexural beam 402 and a second flexural beam 404 spaced apart from each other and linked via an upper transom 408 and a lower transom 410. Collectively, the elements of the cushioned stop 400 can absorb rotational energy while maintaining the engagement portion 406 in contact with the planetary gear stop 13. As the planetary gear assembly 14 rotates relative to the sprocket 12 and the plate 16, the cushioned stop 400 rotates along with the assembly 14 and the engagement portion 406 may engage the stop 13 that prevents further relative angular displacement between the sprocket 12 (the crankshaft) and the plate 16 (the camshaft). The engagement portion 406 can engage the stop 13 as the planetary gear assembly 14 rotates in a first direction or a second direction. When the engagement portion 406 engages the stop 13, the cushioned stop 400 absorbs energy via the flexural beams 402, 404 as these elements can deform to absorb rotational energy.

Figure 5B:
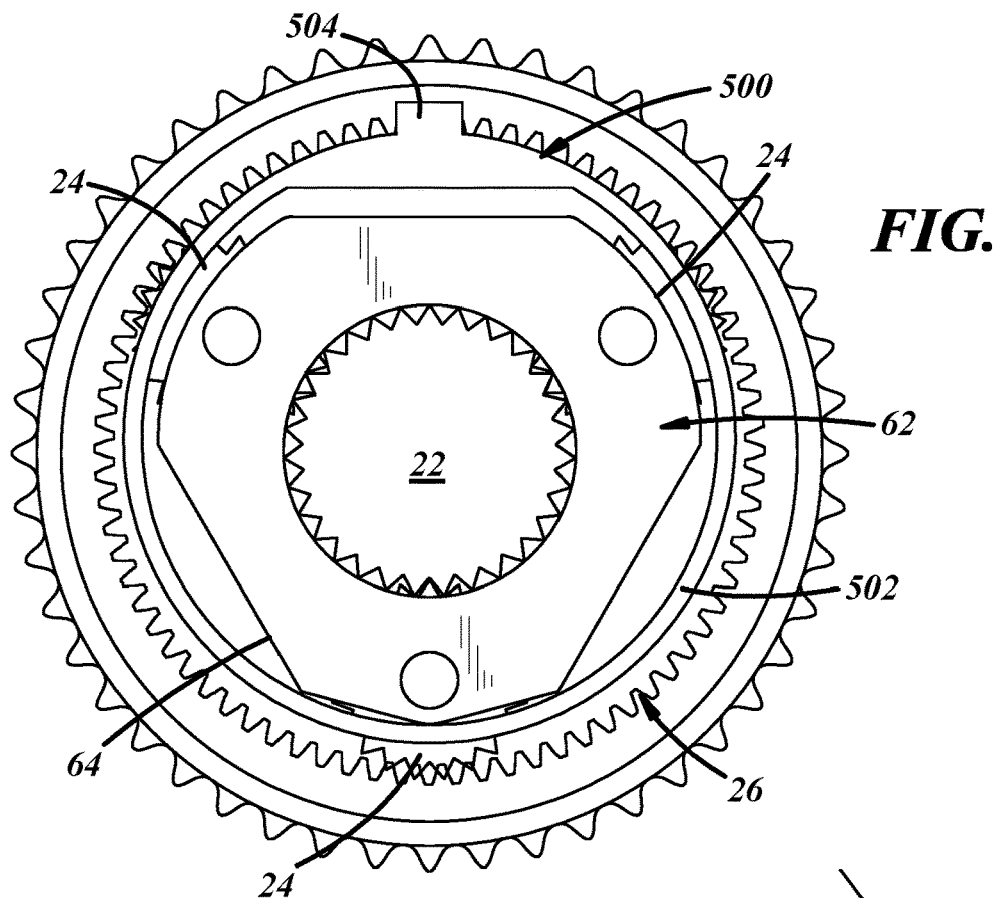
FIG. 5B is a profile view of the implementation of a cushioned stop shown in FIG. 5A.

Turning to FIGS. 5a-5b, a portion of the camshaft phaser 10 is shown along with another embodiment of a cushioned stop 500 carried by the planetary gear assembly 14. Here, the cushioned stop 500 has a diameter that is larger than the carrier assembly 62 and is rigidly attached to the planetary gear assembly 14. And the cushioned stop 500 has a thickness that permits mounting radially outwardly from the carrier assembly 62 yet in between the planetary gear assembly 14 and the sprocket 12 or the plate 16. The cushioned stop 500 includes an annular portion 502 as well as an engagement portion 504. In this embodiment, the cushioned stop 500 is attached to the first carrier plate 64 at a location adjacent to one or more planetary gears 24. The cushioned stop 500 can be made out of an elastomeric material that allow some flexibility and deformation as load is applied to the engagement portion 504. The annular portion 502 of the cushioned stop 500 can absorb rotational energy while maintaining the engagement portion 504 in contact with the stop 13. As the planetary gear assembly 14 rotates relative to the sprocket 12 and the plate 16, the cushioned stop 500 rotates along with the assembly 14 and the engagement portion 504 may engage the stop 13 preventing further relative angular displacement between the sprocket 12 (the crankshaft) and the plate 16 (the camshaft). The engagement portion 504 can engage the stop 13 as the planetary gear assembly 14 rotates in a first direction or a second direction. When the engagement portion 504 engages the stop ring, the cushioned stop 500 absorbs energy by deformation.

Figure 6:
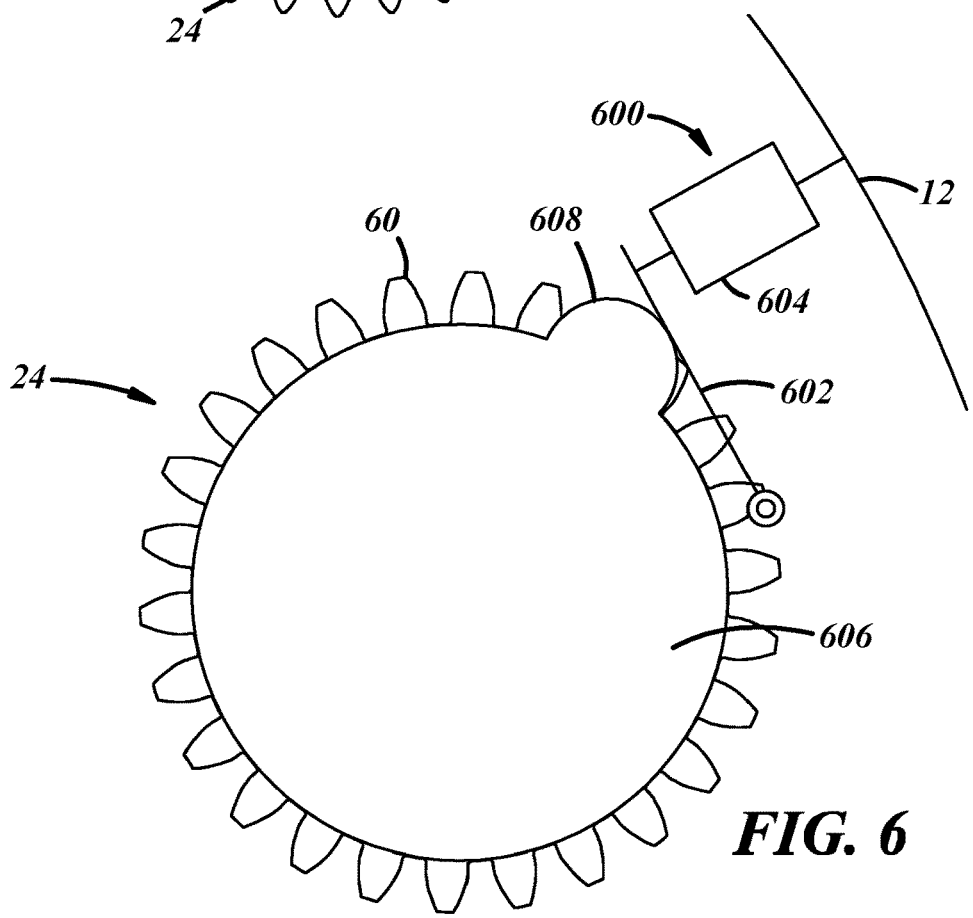
FIG. 6 is a perspective view of another implementation of a cushioned stop along with a portion of an electrically-operated camshaft phaser.

FIG. 6 depicts a portion of the camshaft phaser 10 along with another embodiment of a cushioned stop 600 carried by the planetary gear assembly 14. The cushioned stop 600 can include a compliant or rigid stop plate 602 and a compliant device 604 that absorbs energy exerted by a planet stop 606 on a planetary gear 24 on the sprocket ring 12. The planetary gears 24 can each include a planetary stop 606 that is attached to a gear 24 and rotates about the axis of rotation of the planetary gear 24. The planetary stops 606 can be substantially circular and include a protuberance 608 at one location along an outer edge of the planetary stop. As discussed above, the electric motor 23 can rotate the planetary gear assembly 14 at the same rotational speed as the camshaft to maintain the angular position of the camshaft relative to the crankshaft. When the phase of the camshaft to the crankshaft is changed, the electric motor 23 can rotate its output shaft at a relatively slower or faster rate thereby creating relative angular rotational movement between the sprocket 12 and the plate 16. As this happens, the planetary gears 24 rotate as well and so too does the planetary stop 606 until the protuberance 608 engages with the compliant stop plate 602.

The planetary stops 606 on the planetary gears 24 limit the relative angular displacement between the sprocket 12 and the plate 16 when at least one of the planetary stops 606 fixed to a planetary gear 24 rotates into engagement with the compliant stop plate 602 and transmits energy into the compliant device 604. The compliant stop plate 602 can be fixed at one end to the sprocket 12 and at another end to the compliant device 604. As the planet stop rotates into engagement with the compliant stop plate 602, the plate 602 can deflect and, in the process, absorb at least some of the rotational energy transmitted by the planetary gear assembly 14 while also transmitting a portion of that energy to the compliant device 604. The compliant stop plate 602 can be implemented in a variety of ways, such as by using a metal or plastic tab or bar. The compliant device 604 can be affixed to the sprocket 12 and compliant stop plate 602. In one embodiment, the compliant device 604 can be a biasing element, such as a leaf or coil spring. Or in another element, the compliant device 604 can be an elastomeric material that deforms as it absorbs energy.

FIGS. 7a-7b depict a portion of the camshaft phaser 10 along with another embodiment of a cushioned stop 700 carried by the planetary gear assembly 14. A portion of the carrier assembly 62 is shown in FIG. 7a while FIG. 7b depicts a profile view of the carrier assembly 62 and a portion of the sprocket 12. The first carrier plate 64 and the second carrier plate 66 are connected by a spring bar 702 that is transverse to the plates 64, 66. A biasing member 704 can be carried by the spring bar 702 and engage with the planetary gear stop 13 to absorb energy as the camshaft and crankshaft reach a limit of relative angular displacement. The planetary gear stop 13 can be implemented using any one of the configurations described herein. The biasing member 704 can be a torsional spring that encircles the spring bar 702 having a first end 706 affixed to the second carrier plate 66 and a second end 708 located above an outer edge 710 of the first carrier plate 64. As the planetary gear assembly 14 reaches the limit of the maximum relative angular displacement between the camshaft and the crankshaft, the second end 708 engages the planetary gear stop 13 and transmits the kinetic energy of the rotating planetary gear assembly 14 to the biasing member 704. This loads the biasing member 704 slowing the rotation of the planetary gear assembly 14 spreading the force over a period of time while the assembly 14 stops rotating. The second end 708 of the spring bar 702 can approach and contact the planetary gear stop 13 from one rotational direction. Another embodiment of a cushioned stop 750 is shown in FIG. 7c in which the biasing member 704 is articulated 90 degrees relative to the embodiment shown in FIGS. 7a-7b and is positioned radially outwardly from the spring bar 702. The first end 706 is attached to an opening in the second carrier plate 66 at a point radially-inwardly from the second end 708.

FIG. 7d depicts a portion of the camshaft phaser 10 along with another embodiment of a cushioned stop 700' shown in FIGS. 7a-7b. In this embodiment, a keystone 712 is attached using a fixed or pivotable connection to the second end 708 of the biasing member 704. The keystone 712 rests on the outer edge 710 of the second carrier plate 64 and as the planetary gear assembly 14 reaches the limit of the maximum relative angular displacement between the camshaft and the crankshaft, the keystone 712 pivotably engages the planetary gear stop 13 and transmits the kinetic energy of the rotating planetary gear assembly 14 to the biasing member 704. As the biasing member 704 compresses, a relatively planar surface 714 of the keystone 712 remains in constant contact with the planetary gear stop 13 due to the keystone pivoting about the second end 708. A bottom surface 716 of the keystone 712 can include a curved shape that matches the contour of the outer edge 710 of the first carrier plate 66.

Turning to FIG. 8, an embodiment of a cushioned stop 800 is shown with the carrier plate 62. The cushioned stop 800 comprises a first end 802, a second end 804, and a biasing member 806. The first end 802 can be affixed at an outer edge 808 of the carrier assembly 62 and the second end 804 can extend to an opposite point 810 on the carrier assembly 62 relative to the outer edge 808 so that the second end 804 can engage the planetary gear stop 13. A biasing member center of rotation 812 is located apart from the carrier center of rotation 814. In this embodiment, the biasing member center of rotation 812 is located further from the second end 804 than the carrier center of rotation 814. The biasing member 806 then has unequal length arms such that the distance between the first end 802 and the biasing member center of rotation 812 is less than the distance between the second end 804 and the biasing member center of rotation 812. As the second end 804 engages the planetary gear stop 13 and rotates about the biasing member center of rotation 812, the second end 804 moves radially away from the outer edge 808 improving contact with the stop 13. The planetary gear stop 13 can approach the second end 804 from either rotational direction so that the cushioned stop 800 can absorb energy regardless of whether the planetary gear assembly 14 is rotating in one rotational direction or another rotational direction.

Figure 9A:
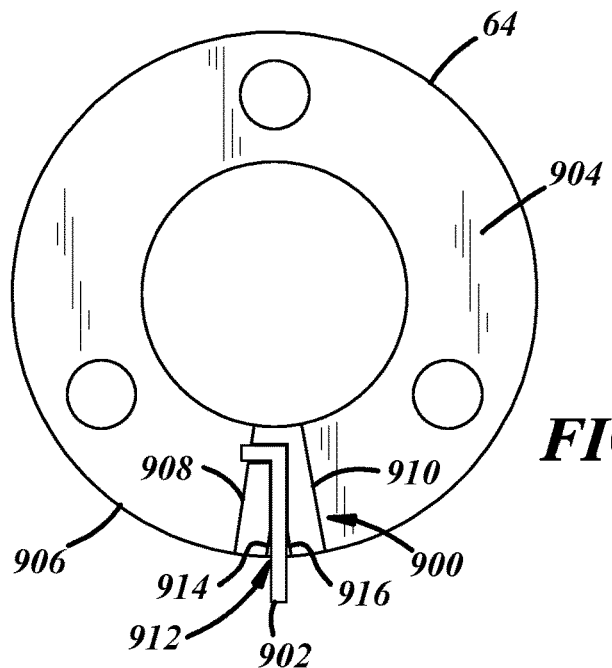
FIG. 9A is a profile view of another implementation of a cushioned stop along with a portion of an electrically-operated camshaft phaser.
Figure 9B:
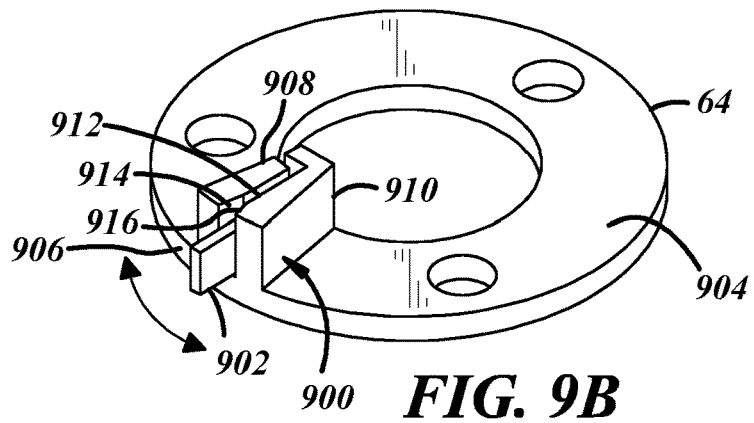
FIG. 9B is a perspective view of the cushioned stop shown in FIG. 9A.

FIGS. 9a-9b depict different views of an embodiment of the first carrier plate 64 including a cushioned stop 900. FIG. 9a is a profile view of the first carrier plate 64 and the cushioned stop 900 while FIG. 9b is a perspective view of the first carrier plate 64 and the cushioned stop 900. The cushioned stop 900 includes a leaf spring 902 located on a side 904 of the first carrier plate 64. The leaf spring 902 can be a substantially planar element positioned perpendicularly or substantially perpendicularly relative to the side 904 extending radially beyond the first carrier plate 64 or axially beyond the second carrier plate 66 to engage the planetary gear stop 13. The leaf spring 902 can be held there by various types of fasteners, such as a rivet, a screw, or a wedge. A first flange 908 and a second flange 910 are affixed perpendicularly to the side 904 and define a slot 912 that receives the leaf spring 902. The slot 912 is L-shaped for receipt of an L-shaped leaf spring 902. As the cushioned stop 900 is assembled, the L-shaped leaf spring 902 can be inserted into the slot 912 and the resulting assembly can quickly, accurately, and repeatably precisely provide the correct amount of leaf spring 902 exposed beyond the slot 912. This implementation provides a number of benefits, such as being economic and relatively simple to manufacture along with offering the ability of change aspects of the cushioned stop 900 to vary the amount of stiffness or cushioning the stop 900 provides.

The cushioning performance of the leaf spring 902 can be varied by the thickness of the leaf spring 902 as well as the amount of leaf spring that extends radially outwardly from an edge 906 of the first carrier plate 64. A relatively thinner leaf spring 902 extending further from the edge 906 provides more cushioning than a relatively thicker leaf spring 902 that does not extend as far from the edge 906. The first flange 908 and/or the second flange 910 can include a first surface 914 and a second surface 916, respectively. The first surface 914 can slope such that the first flange 908 reduces in thickness moving from a point closer to an inner diameter 918 of the first carrier plate 64 toward a point closer to an outer diameter 920 of the first carrier plate 64. And the second surface 916 can slope in a similar manner. The amount of slope of the first surface 914 and the second surface 916 can vary depending on how much deflection of the leaf spring 902 is desired. The relative relationship between the first surface 914 and the second surface 916 can be constant or flat such that the surfaces 914, 916 are parallel with each other. Or in another embodiment, the relative relationship between the first surface 914 and the second surface 916 can be curvilinear so that each surface 914, 916 is parabolic. And in yet another embodiment the relative relationship between the first surface 914 and the second surface 916 can be progressive such that the distance between the surfaces 914, 916 is greater at a radially-outward point and shorter at a radially-inward point. It is also possible to increase the slope of one surface relative to the other so that an asymmetrical amount of cushioning occurs in one rotational direction relative to the other rotational direction. For example, the first surface 914 can have a greater slope than the second surface 916. That is, the first flange 908 may be narrowed more than the second flange 910. Or the first surface 914 can have a greater angle of deviation from the remaining portion of the first flange 908 that defines a portion of the slot 912 than the angle of deviation between the second surface 916 and the rest of the second flange 910 that defines another portion of the slot 912. In this way, the first surface 914 allows more deflection of the leaf spring 902 than the second surface 916. The term "cushioning" or amount of such cushioning can mean the angular distance over which force is absorbed. The greater the angular distance, the more cushioning a cushioned stop provides. The cushioning performance can also be defined by the presence and design of ramps that allow the spring to change its effective length under load.

Figure 10A:
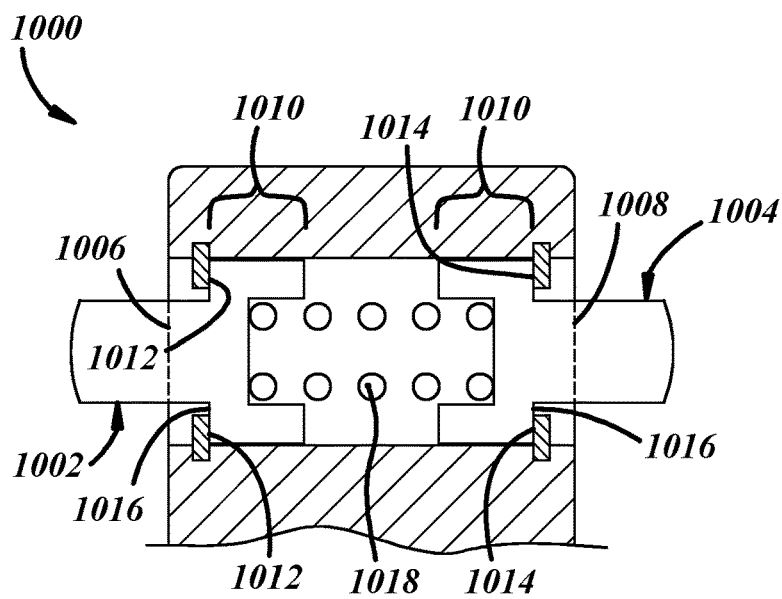
FIG. 10A is a cross-sectional view of another implementation of a cushioned stop along with a portion of an electrically-operated camshaft phaser.

Turning to FIGS. 10a-10d, different implementations of cushioned stops are shown. Here, the cushioned stops can be implemented as part of the planetary gear stop 13 shown in FIG. 1 or described elsewhere in the application. FIG. 10a depicts a cross-sectional view of one implementation of the planetary gear stop 13 including a cushioning stop 1000 in which a first cushioning element 1002 and a second cushioning element 1004 extending normal to the contact surface of the stop 13 through a first opening 1006 and a second opening 1008, respectively. A portion of the cushioning elements 1002, 1004 can have an increased diameter 1010 such that a first shoulder 1012 of the first cushioning element 1002 and a second shoulder 1014 of the second cushioning element 1004 each engages an internal surface 1016 of the planetary gear stop 13. A biasing element 1018 simultaneously biases the first shoulder 1012 and second shoulder 1014 into contact with the internal surface 1016.

The cushioning stop 1000 is configured to cushion the planetary gear assembly 14 in two different angular directions. In a first direction, the first cushioning element 1002 contacts a portion of the planetary gear assembly 14 when the limit of the angular displacement between the camshaft and crankshaft has been reached. The first cushioning element 1002 can then slide relative to the first opening 1006 such that the first shoulder 1012 is no longer in contact with the internal surface 1016. This compresses the biasing element 1018 absorbing rotational force from the planetary gear assembly 14. In a second direction, the second cushioning element 1004 contacts a portion of the planetary gear assembly 14 when another limit of the angular displacement between the camshaft and crankshaft has been reached. The second cushioning element 1004 can then slide relative to the second opening 1008 such that the second shoulder 1014 is no longer in contact with the internal surface 1016. This compresses the biasing element 1018 absorbing rotational force from the planetary gear assembly 14. FIG. 10b depicts another implementation of a cushioning element 1100 having a similar arrangement that is shown in FIG. 10a but includes a hydraulic conduit 1102 that receives and absorbs force transmitted from the first cushioning element 1002 and the second cushioning element 1004.

FIG. 10c-10d depict profile views of different implementations of cushioning elements. In FIG. 10c, a cushioning element 1200 includes a leaf spring 1202 that fits over the planetary gear stop 13. The leaf spring 1202 is shaped to squeeze the exterior of the planetary gear stop 13 and prevent relative movement between the cushioned element 1200 and the stop 13. In this implementation, the cushioned element contacts the planetary gear stop 13 at four points. In addition, the leaf spring 1202 includes a first biasing surface 1204 and a second biasing surface 1206 that each absorbs force from the planetary gear assembly 14 as is described above in more detail. FIG. 10d depicts an implementation of a cushioned stop 1300 in which the stop comprises an elastomeric material. The cushioned stop 1300 could be overmolded onto or inserted into the sprocket 12 and use a reinforcing member or housing that loads the elastomeric material, preferably in compression.

Other embodiments of cushioning elements are shown in FIGS. 11a-11d. FIG. 11a is a profile view of a cushioning stop 1100 and the carrier assembly 62 while FIG. 11b is a cross-section of a spring. The cushioning stop 1100 includes a plurality of openings 1102, 1104 that extend from one side of the cushioning stop 1100 to another side of the cushioning stop 1100. Each of the openings 1102, 1104 receive a spring 1106, 1108. A protuberance 1110 is located on an outer surface of the cushioning stop 1100. The cushioning stop 1100 is constructed as a separate element that can rotate relative to the carrier assembly 62 about a pivot 1112. When the cushioning stop 1100 rotates in one direction along with the planetary gear assembly 14 such that the protuberance 1110 contacts the stop 13, the spring 1106 is compressed and absorbs the rotational energy of the planetary gear assembly 14. The cushioning stop 1100 then rotates about the pivot 1112 relative to the carrier assembly 62. And when the cushioning stop 1100 rotates in another direction along with the planetary gear assembly 14 such that the protuberance 1110 contacts the stop 13, the spring 1108 is compressed and absorbs the rotational energy of the planetary gear assembly 14. The cushioning stop 1100 then rotates about the pivot 1112 relative to the carrier assembly 62 in an opposite direction.

FIG. 11c depicts a cushioning stop 1120 attached to the carrier assembly 62. A torsional spring 1122 can be held against a surface of the first carrier plate 64 using a first spring stud 1124 and a second spring stud 1126. The torsional spring 1122 can include a first end 1126 and a second end 1128 that extend radially outwardly from the carrier assembly 62 to selectively engage the stop 13. As the planetary gear assembly 14 rotates and reaches a limit of angular displacement between the camshaft and the crankshaft, the first end 1126 or the second end 1128 can contact the stop 13 and transmit the rotational force from the planetary carrier assembly 14 to the torsional spring 1122.

FIGS. 11d-11e depict a cushioning stop 1150 attached to a first carrier plate 64 of the carrier assembly 62 in a compressed state (FIG. 11c) and in a relaxed state (FIG. 11d). The cushioning stop 1150 includes a torsional spring 1152 attached to the carrier assembly 62 at a first point 1154 and to the cushioning stop 1150 at a second point 1156. A protuberance 1158 is located on an outer surface of the cushioning stop 1150. When the cushioning stop 1150 rotates in one direction along with the planetary gear assembly 14 such that the protuberance 1152 contacts the stop 13, the torsional spring 1152 is compressed and absorbs the rotational energy of the planetary gear assembly 14. The cushioning stop 1150 rotates about a pivot 1160. And when the cushioning stop 1150 rotates in another direction along with the planetary gear assembly 14 such that the protuberance 1158 contacts the stop 13, the torsional spring 1152 is compressed and absorbs the rotational energy of the planetary gear assembly 14. The cushioning stop 1150 rotates about a pivot 1160 in a different direction.

Figure 12:
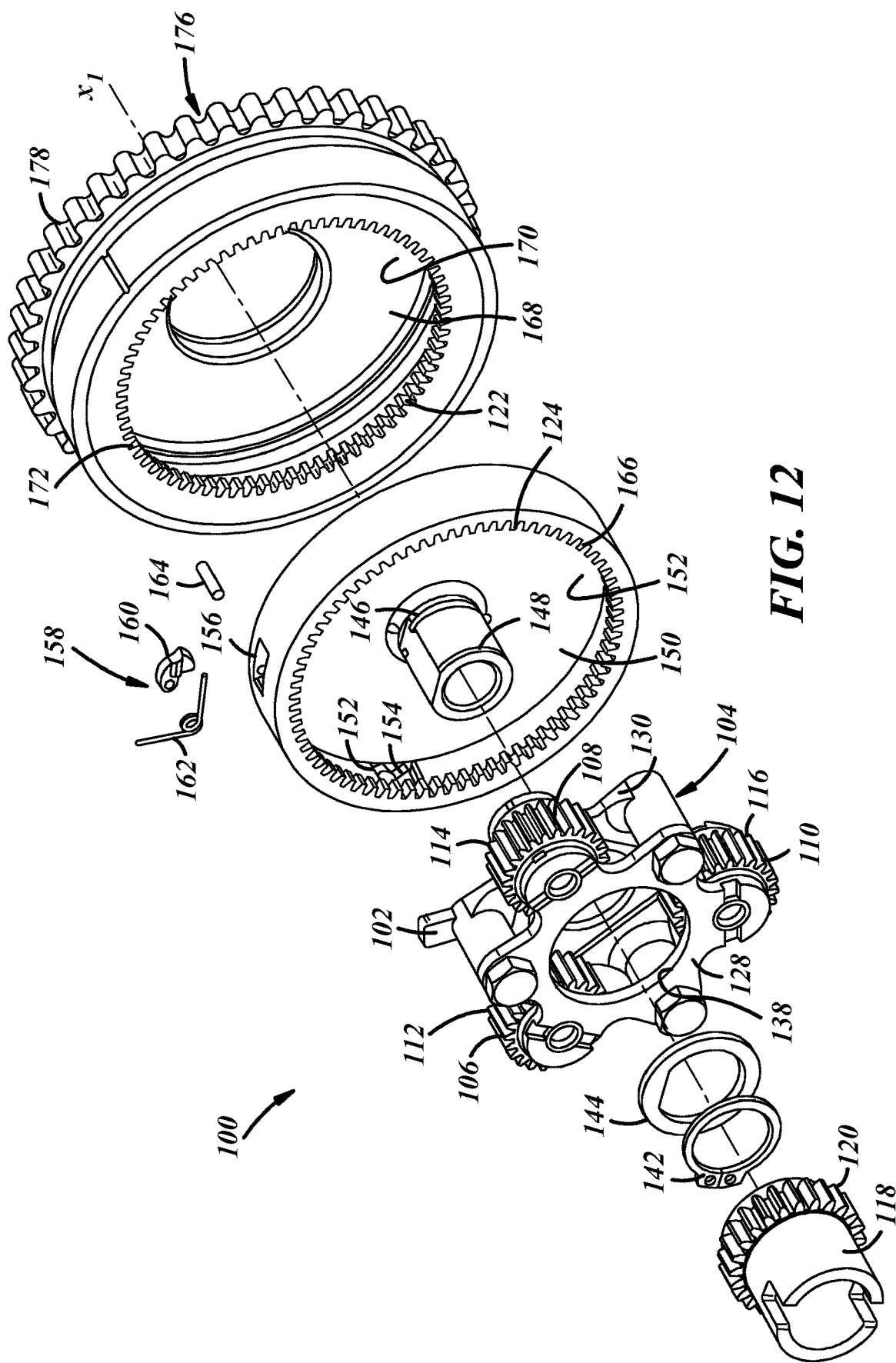
FIG. 12 is an exploded view depicting a portion of an implementation of an electrically-operated camshaft phaser.
Figure 13:
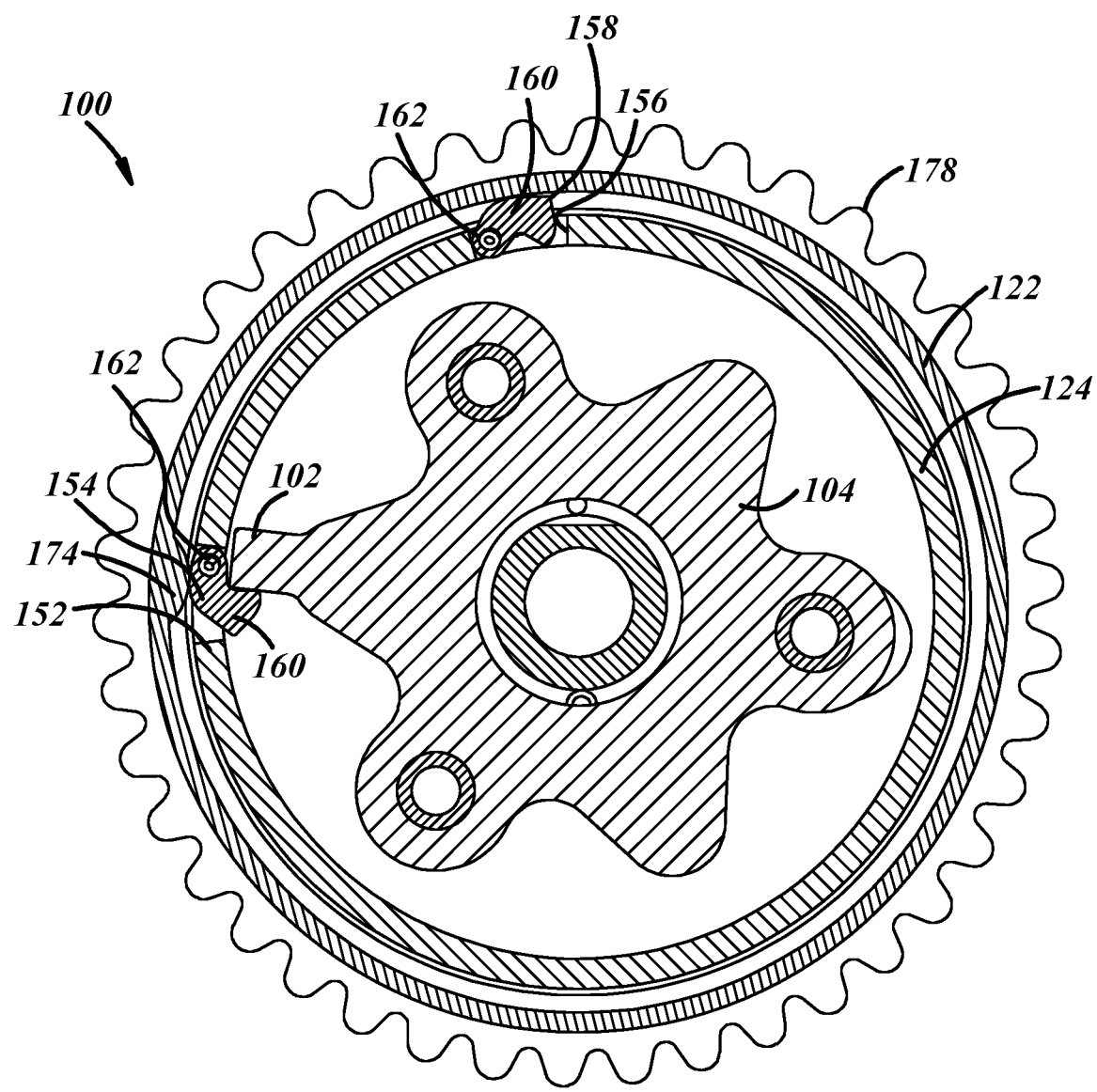
FIG. 13 is a profile view of a portion of an implementation of an electrically-operated camshaft phaser.

FIGS. 12-13 depict another embodiment of a camshaft phaser 100 that uses a stop 102 that is attached to a planetary carrier 104. The phaser 100 has a split ring gear planetary drive which includes planet gears 106, 108, 110 with planet gear teeth 112, 114, 116, a centrally located sun gear 118 with sun gear teeth 120, and a split ring gear including a sprocket ring gear 122 and a camshaft ring gear 124. The sun gear 118 has a bore 126 for receiving an output shaft (not shown). The planet gears 106, 108, 110 are held together by the planetary carrier 104. The carrier 104 has a first plate 128 and a second plate 130. Each planet gear 106, 108, 110 is connected to the first plate 128 and the second plate 130 which makes up the carrier 104 through pins 132, 134, 136 about which the planet gears 106, 108, 110 rotate. The planetary carrier 104 has a centrally located bore 138 for receiving the sun gear 118. The sun gear teeth 120 are aligned with and engage the planet gear teeth 106, 108, 110. The planetary carrier 104 is kept in place axially by a retaining ring 142 and washer 144 received within a slot 146 in the centrally located flange 148 of the camshaft ring gear 124.

The planet carrier 104 and associated planet gears 106, 108, 110 are received within an inner diameter 150 defining a bore 152 of the camshaft ring gear 124. The camshaft ring gear 124 has a first hole 152 for receiving a first spring biased pivoting pawl 154 and a second hole 156 for receiving the second spring biased pivoting pawl 158. The first and second spring biased pivoting pawls 154, 158 include a pawl 160, a spring 162, and a pin 164 in which the pawls 160 pivots on. The pivoting pawls 154, 158 have a first position in which the pawl 160 is contained within the ring gears 122, 124 and a second position in which the pawl 160 is pivoted on the pin 164, such that at least a portion of the pawl 160 is present in the inner diameter 150 of the camshaft ring gear 124 and can interfere with the travel of the planet carrier 104 as it rotates. The spring 162 biases the pawl 160 towards the sprocket ring gear 122. Also present on the inner diameter 150 of the camshaft ring gear 124 is a set of ring gear teeth 166.

The camshaft ring gear 124 is received by a bore 168 formed by an inner diameter 170 of the sprocket ring gear 122. The outer circumference of the sprocket ring gear 122 includes sprocket teeth 178. A portion of an inner diameter 170 of the sprocket ring gear 122 contains ring gear teeth 172. On the inner diameter 170 of the sprocket ring gear 122 is a cam mechanism 174. The cam mechanism 174 is spaced at an interval along an inner diameter of the sprocket ring gear 122. The ring gears 122, 124 have different numbers of teeth 166, 172, where the difference in the number of teeth is a multiple of the number of planet gears 106, 108, 110. The ring gear teeth 166, 172 have profiles to allow the ring gears 122, 124 to mesh properly with the planet gears 106, 108, 110. The planetary gears 106, 108, 110 rotate around the sun gear 118 and within the ring gears 122, 124 such that the planetary gears 106, 108, 110 travel along hypocycloid curves, a curve generated by the trace of a fixed point on a small circle (planetary gear) that rolls within a larger circle (ring gear).

When the phaser 100 is in an advanced stop position as shown in FIG. 13, the stop 102 on the planetary carrier 104 is engaged with the first spring biased pivoting pawl 154. After the stop 102 of the planetary carrier 104 engages the first spring biased pivoting pawl 154, the planetary gear 110 can no longer rotate any further in the same direction, and can only turn in the opposite direction. Thus, the phaser 100 is held in a position representing a maximum advanced condition.

An engine crankshaft (not shown) is rotationally engaged through a timing chain (not shown) to the sprocket ring gear 122 through a sprocket 176, and the engine camshaft is rotationally engaged to the camshaft ring gear 124. An electric motor (not shown) is rotationally engaged with the sun gear 118 by way of an output shaft (not shown). When the sun gear 118 is rotated by the electric motor at the same speed as either of the ring gears 122, 124, since both ring gears 122, 124 rotate in unison, a constant cam phase position is maintained. When the sun gear 118 is driven at a different speed from the ring gears 122, 124 by the electric motor, a slightly different speed of one ring gear to the other ring gear causes a cam phase shift function. In this way, a very high numerical ratio is obtained and the camshaft is phased either plus or minus from the nominal rotational relationship of the crankshaft to the camshaft.

In this implementation, the camshaft ring gear 124 includes the first spring biased pawl 154 within the first hole 152 of the ring gear 124, limiting the travel of the phaser 100 in a first direction to a first stop position (advanced). In this position, the first spring biased pawl 154 is pushed inwards towards the planetary carrier 14 by the cam mechanism 174 included with the sprocket 176. The movement of the pawl 160 inwards ensures that the first spring biased pawl 152 engages with the stop 102 on the planetary carrier 104 and halts any further rotation of the camshaft ring gear 124 clockwise, and halts any further rotation of the planetary gears (not shown) in the clockwise direction and halts any rotation of the planetary carrier 104 in the counterclockwise direction. The end stop 102 on the carrier plate 104 can be implemented as one of the cushioned stops discussed above, including, but not limited to, the cushioned stops shown in FIGS. 4, 5a-5b, 7a-7d, 8, 9a-b, 10a-d, and 11a-d.

It is to be understood that the foregoing is a description of one or more embodiments of the invention. The invention is not limited to the particular embodiments) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A variable camshaft timing device that adjusts phase between a camshaft and a crankshaft, comprising:
   a first ring gear configured to connect to the camshaft and rotate about a center axis, having a plurality of radially-inwardly facing gear teeth;
   a second ring gear axially spaced from the first ring gear, configured to receive rotational input from the crankshaft and rotate about the center axis, having a plurality of radially-inwardly facing gear teeth;
   a planetary gear assembly including one or more planet gears that are configured for rotation by an electric motor and engage the first ring gear and the second ring gear through the planet gear(s); and
   a cushioned stop configured to transmit energy between the planetary gear assembly and a planetary gear stop attached to a sprocket or a camshaft plate.

2. The variable camshaft timing device of claim 1, wherein the planetary gear stop moves radially inwardly and radially outwardly relative to the center axis.

3. The variable camshaft timing device of claim 2, wherein the planetary gear stop moves about a pivot.

4. The variable camshaft timing device of claim 1, further comprising a carrier assembly configured for rotation by the electric motor along with the planetary gear assembly, wherein the cushioned stop includes a protuberance and a plurality of openings each receiving at least one spring that absorb energy between the planetary gear assembly and the planetary gear stop via the protuberance, and wherein the cushioned stop attaches to and is angularly displaced relative to the carrier assembly about a pivot.

5. The variable camshaft timing device of claim 1, wherein the cushioned stop is carried by the planetary gear assembly and further comprises a first flexural beam and a second flexural beam linked by an upper transom and a lower transom.

6. The variable camshaft timing device of claim 1, wherein the cushioned stop comprises an annular portion with a diameter that is larger than a diameter of a carrier assembly.

7. The variable camshaft timing device of claim 1, wherein the cushioned stop comprises a biasing member having an end above an outer edge of a carrier plate.

8. The variable camshaft timing device of claim 7, wherein the cushioned stop further comprises a keystone that rests on an outer edge of the carrier plate.

9. The variable camshaft timing device of claim 7, wherein the cushioned stop further comprises a keystone that pivots about an axis.

10. The variable camshaft timing device of claim 1, wherein the cushioned stop comprises a first end affixed at an outer edge of a carrier assembly and a second end extends to an opposite point on the carrier assembly.

11. The variable camshaft timing device of claim 1, wherein the cushioned stop comprises a spring bar connecting a first carrier plate and a second carrier plate of the planetary gear assembly and a biasing member positioned radially outwardly from the spring bar engaging at least one of the first carrier plate or the second carrier plate.

12. The variable camshaft timing device of claim 1, wherein the cushioned stop further comprises a leaf spring attached to the planetary gear assembly.

13. The variable camshaft timing device of claim 12, wherein the leaf spring further comprises a first surface and a second surface, wherein the first surface is parallel to the second surface.

14. The variable camshaft timing device of claim 12, wherein the leaf spring further comprises a first surface and a second surface, wherein the first surface is curvilinear relative to the second surface.

15. The variable camshaft timing device of claim 12, wherein the leaf spring further comprises a first surface and a second surface, wherein the first surface is progressively distant relative to the second surface.

16. The variable camshaft timing device of claim 12, wherein the leaf spring further comprises a first surface and a second surface, wherein the first surface and the second surface are asymmetrical to each other.

17. The variable camshaft timing device of claim 12, wherein the planetary gear assembly includes a first flange and a second flange that engage the leaf spring.

18. A variable camshaft timing device that adjusts phase between a camshaft and a crankshaft, comprising:
   a first ring gear, configured to connect to the camshaft and rotate about a center axis, having a plurality of radially-inwardly facing gear teeth;
   a second ring gear axially spaced from the first ring gear, configured to receive rotational input from the crankshaft and rotate about the center axis, having a plurality of radially-inwardly facing gear teeth;
   a planetary gear assembly including one or more planet gears engaged with the first ring gear and the second ring gear and positioned radially inwardly from the first ring gear and the second ring gear;
   an electric motor having an output shaft that rotates the planetary gear assembly and controls phase adjustment between the camshaft and crankshaft by angularly displacing the first ring gear with respect to the second ring gear; and
   a cushioned stop that is carried by the planetary gear assembly and isolated from the output shaft of the electric motor, wherein the cushioned stop absorbs rotational energy when engaged with a planetary gear stop of the variable camshaft timing device.

19. The variable camshaft timing device of claim 18, wherein the cushioned stop further comprises a first flexural beam and a second flexural beam linked by an upper transom and a lower transom.

20. The variable camshaft timing device of claim 18, wherein the planetary gear stop moves radially inwardly and radially outwardly relative to the center axis.

21. The variable camshaft timing device of claim 18, wherein the planetary gear stop moves about a pivot.

22. The variable camshaft timing device of claim 18, wherein the cushioned stop comprises an annular portion with a diameter that is larger than a diameter of a carrier assembly.

23. The variable camshaft timing device of claim 18, wherein the cushioned stop comprises a biasing member having an end above an outer edge of a carrier plate.

24. The variable camshaft timing device of claim 18, wherein the cushioned stop further comprises a keystone that rests on an outer edge of the carrier plate.

25. The variable camshaft timing device of claim 18, wherein the cushioned stop comprises a first end affixed at an outer edge of a carrier assembly and a second end extends to an opposite point on the carrier assembly.

26. The variable camshaft timing device of claim 18, wherein the cushioned stop comprises a spring bar connecting a first carrier plate and a second carrier plate of the planetary gear assembly and a biasing member positioned radially outwardly from the spring bar engaging at least one of the first carrier plate or the second carrier plate.

27. A variable camshaft timing device that adjusts phase between a camshaft and a crankshaft, comprising:
   a first ring gear, configured to connect to the camshaft and rotate about a center axis, having a plurality of radially-inwardly facing gear teeth;
   a second ring gear axially spaced from the first ring gear, configured to receive rotational input from the crankshaft and rotate about the center axis, having a plurality of radially-inwardly facing gear teeth;
   a planetary gear assembly configured for rotation by an electric motor and including one or more planet gears engaging the first ring gear and the second ring gear; and
   a cushioned stop that is mechanically linked to a sprocket or a camshaft plate and absorbs rotational energy from the planetary gear assembly through a planet gear.

28. The variable camshaft timing device of claim 27, further comprising a planetary gear stop that selectively engages the cushioned stop.

29. The variable camshaft timing device of claim 28, wherein the planetary gear stop moves radially inwardly and radially outwardly relative to the center axis.

30. The variable camshaft timing device of claim 29, wherein the planetary gear stop moves about a pivot.

* * * * *